(12) United States Patent
Hayashi et al.

(10) Patent No.: US 11,364,915 B2
(45) Date of Patent: Jun. 21, 2022

(54) ROAD CONDITION DETERMINATION METHOD AND ROAD CONDITION DETERMINATION DEVICE

(71) Applicant: Nissan Motor Co., Ltd., Yokohama (JP)

(72) Inventors: Takuma Hayashi, Kanagawa (JP); Atsuhiro Mori, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 57 days.

(21) Appl. No.: 16/769,628

(22) PCT Filed: Dec. 7, 2017

(86) PCT No.: PCT/JP2017/043928
§ 371 (c)(1),
(2) Date: Jun. 4, 2020

(87) PCT Pub. No.: WO2019/111366
PCT Pub. Date: Jun. 13, 2019

(65) Prior Publication Data
US 2020/0317205 A1    Oct. 8, 2020

(51) Int. Cl.
*B60W 40/068* (2012.01)
*B60W 30/18* (2012.01)
(Continued)

(52) U.S. Cl.
CPC .......... *B60W 40/068* (2013.01); *B60W 30/18* (2013.01); *G01C 21/3691* (2013.01);
(Continued)

(58) Field of Classification Search
CPC .............. B60W 40/068; B60W 30/18; B60W 2552/40; B60W 2420/42; B60W 30/02;
(Continued)

(56) References Cited

U.S. PATENT DOCUMENTS

2004/0204812 A1* 10/2004 Tran ................. G01S 15/02
701/80
2005/0143889 A1* 6/2005 Isaji ................. G08G 1/161
701/70
(Continued)

FOREIGN PATENT DOCUMENTS

JP      2002-127882 A    5/2002
JP      2002-310896 A   10/2002
(Continued)

*Primary Examiner* — Elaine Gort
*Assistant Examiner* — Ellis B. Ramirez
(74) *Attorney, Agent, or Firm* — Global IP Counselors, LLP (57) ABSTRACT

In the present invention, when a road surface condition is determined based on information acquired by a camera installed in a vehicle, a route of a host vehicle is predicted and the is determined. A road surface condition determination method and device determines a road surface condition of a predicted route based on information acquired by a camera installed in a host vehicle. A controller predicts a route of the host vehicle by determining a road surface friction coefficient of the predicted route based on information acquired by the camera. The determining of the road surface friction coefficient of the predicted route includes: dividing an ahead-of-vehicle image acquired by the camera in a left-right direction and determining a road surface condition for each of the determination areas, and determining the road surface friction coefficient in the determination areas through which the predicted route will pass.

3 Claims, 6 Drawing Sheets

(51) Int. Cl.
*G01C 21/36* (2006.01)
*G01N 21/84* (2006.01)

(52) U.S. Cl.
CPC ......... *G01N 21/84* (2013.01); *B60W 2420/42* (2013.01); *B60W 2552/40* (2020.02)

(58) Field of Classification Search
CPC ....... B60W 2420/40; B60W 2420/403; B60W 40/064; G01C 21/3691; G01N 21/84; G01N 21/17; G06K 9/629; G06K 9/00791; B60T 2270/213; G01W 1/00
USPC .................................. 701/80, 117; 382/108
See application file for complete search history.

(56) References Cited

U.S. PATENT DOCUMENTS

| | | | |
|---|---|---|---|
| 2010/0020170 A1* | 1/2010 | Higgins-Luthman | ........................ G06K 9/00791 348/135 |
| 2012/0078483 A1* | 3/2012 | Yajima | ................ B60W 40/068 701/73 |
| 2014/0347448 A1* | 11/2014 | Hegemann | ................ G06T 7/90 348/46 |
| 2015/0224925 A1 | 8/2015 | Hartmann | |
| 2015/0371095 A1 | 12/2015 | Hartmann et al. | |
| 2019/0251370 A1* | 8/2019 | Askeland | .................. G06T 7/73 |

FOREIGN PATENT DOCUMENTS

| | | |
|---|---|---|
| JP | 2005-178622 A | 7/2005 |
| JP | 2007-232652 A | 9/2007 |
| JP | 2008-709998 A | 3/2008 |
| JP | 2016-143399 A | 8/2016 |
| JP | 6482116 B2 | 3/2019 |

\* cited by examiner

| CONDITION | ROAD SURFACE μ |
|---|---|
| DRY | 1.0 |
| WET | 0.7 |
| SNOW | 0.3 |
| ICE | 0.1 |

ROAD CONDITION DETERMINATION METHOD AND ROAD CONDITION DETERMINATION DEVICE

CROSS-REFERENCE TO RELATED APPLICATIONS

This application is a U.S. national stage application of International Application No. PCT/JP2017/043928, filed on Dec. 7, 2017.

TECHNICAL FIELD

The present invention relates to a road surface condition determination method for determining a condition of a road surface.

BACKGROUND INFORMATION

Japanese Laid-Open Patent Application No. 2007-232652 discloses a technique for determining a condition of a road surface based on information acquired by a camera capable of capturing ultraviolet images, infrared images, and temperature distribution images.

SUMMARY

However, when a camera such as is described in Japanese Laid-Open Patent Application No. 2007-232652 is installed in a vehicle and vehicle control is performed using an estimated road surface friction coefficient, proper use has been difficult even when a distribution of road surface friction coefficients ahead is simply ascertained. Specifically, from the standpoint of ensuring the safety of the vehicle, control must be performed by assessing as a low μ road when a low μ road and a high μ road are distributed ahead of the vehicle. However, a problem has been encountered in which, when the road surface friction coefficient of a region in which the vehicle is actually traveling, or more specifically of a region in which the wheels of the vehicle contact the ground, is that of a high μ road, controlling by assessing as a low μ road cannot ensure sufficient travel performance.

An object of the present invention is to provide a road surface condition determination method and a road surface condition determination device with which it is possible to accurately estimate a road surface friction coefficient optimal for vehicle travel from road surface friction coefficients ahead of the vehicle.

To achieve this object, in the present invention, when a road surface condition is determined based on information acquired by a camera installed in a vehicle, a route of a host vehicle is predicted and the road surface condition of the predicted route is determined.

Therefore, a road surface condition necessary for the host vehicle can be accurately determined.

DETAILED DESCRIPTION OF THE EMBODIMENTS

A preferred embodiments according to the present disclosure will be described below in more detail based on the drawings.

First Embodiment

Figure 1:
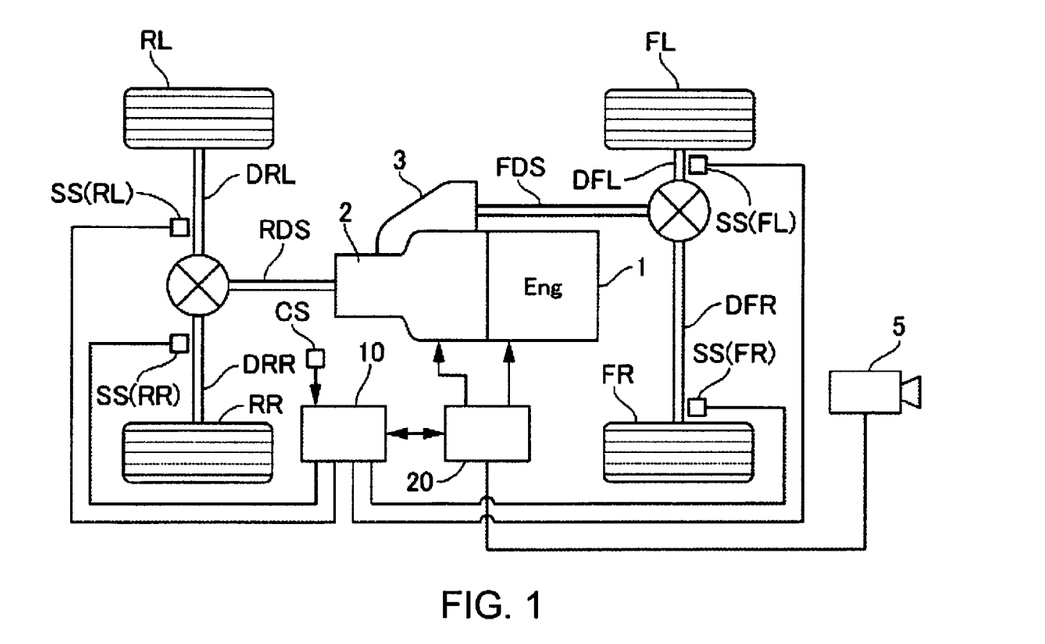
FIG. 1 is a system diagram of a vehicle in accordance with a first embodiment.

FIG. 1 is a system diagram of a vehicle in the first embodiment. The vehicle in the first embodiment is a four-wheel-drive vehicle having a rear-wheel-drive base. The vehicle has an engine 1, an automatic transmission 2, and a transfer 3. The automatic transmission 2 changes a speed of the engine 1 and outputs some or all of torque outputted from the engine 1 from a rear drive shaft RDS. The torque outputted from the rear drive shaft RDS is transmitted through a left-rear-wheel drive shaft DRL and a right-rear-wheel drive shaft DRR to rear wheels RL, RR (written also simply as rear wheels below). The transfer 3 outputs some of the torque outputted from the engine 1 from a front drive shaft FDS. The torque outputted from the front drive shaft FDS is transmitted through a left-front-wheel drive shaft DFL and a right-front-wheel drive shaft DFR to front wheels FL, FR (written also simply as front wheels below).

The vehicle has vehicle wheel speed sensors SS (FL, FR, RL, RR) that detect rotation states of vehicle wheels FL, FR, RL, RR, and an integrated sensor CS that detects a longitudinal acceleration rate Gx, lateral acceleration rate Gy, and yaw rate Yaw of the vehicle. A brake controller 10 receives sensor signals from the vehicle wheel speed sensors SS, computes a vehicle wheel speed Vw and a vehicle body speed Vx, and receives various sensor signals (Gx, Gy, Yaw) from the integrated sensor CS.

Based on the received sensor signals and the computed information, the brake controller 10 executes, inter alia: anti-lock brake control (written below as ABS) that minimizes a tendency of the vehicle wheels to lock; vehicle dynamics control (written below as VDC) that stabilizes vehicle behavior; and automatic braking control based on a braking request received from an automatic driving controller (not shown), and controls a brake condition (not shown).

A controller 20 has an engine control unit that controls the driving condition of the engine 1, a shift control unit that controls the shift condition of the automatic transmission 2, and a driving force distribution control unit that controls a driving force distribution condition of the transfer 3. The engine control unit controls the speed and the torque of the engine 1 according to a throttle position, a fuel injection amount, a plug spark timing, etc. The shift control unit decides an optimal shift position based on a vehicle speed VSP and an accelerator pedal position APO and shifts to a shift position selected by hydraulic pressure control within the automatic transmission 2. The driving force distribution control unit computes a driving force to be distributed to the front wheels and a driving force to be distributed to the rear wheels and controls the torque transmitted from the transfer 3 to the front-wheel side based on a traveling condition of the vehicle.

The vehicle has a camera 5 capable of capturing ultraviolet images, infrared images, and temperature distribution images of the area ahead of the vehicle. Images captured by the camera 5 are inputted to the controller 20. A road surface condition determination unit is present inside the controller 20. A road surface condition determination device in the first embodiment is configured from the camera 5 and the road surface condition determination unit inside the controller 20. Using an ultraviolet image, an infrared image, and a temperature distribution image of a road surface a condition of which is to be determined, the road surface condition determination unit determines the condition of the road surface in a state in which light including ultraviolet rays and infrared rays hits the road surface. The term "condition of the road surface" refers to a condition of snow, water, and ice on the road surface, and to distributions thereof. Ultraviolet rays readily scatter upon hitting a physical object, and ultraviolet rays are known to be largely scattered particularly on snowy surfaces. Therefore, the condition of snow on the road surface can be sensed from a feature quantity value that pertains to ultraviolet rays on the road surface, and the distribution of snow on the road surface can be sensed if sensing is performed in the entire area ahead of the vehicle. Because infrared rays are readily absorbed by water, the condition of water on the road surface can be sensed from a feature quantity value of infrared rays on the road surface, and the distribution of water on the road surface can be sensed if sensing is performed in the entire area ahead of the vehicle. The condition of ice on the road surface has a correlative relationship with road surface temperature. Therefore, the feature quantity values of ultraviolet rays and infrared rays are calculated from an image and the condition of the road surface is determined from a temperature distribution image of the road surface. In the first embodiment, a dry road surface is determined as DRY, a wet road surface as WET, a snow-covered road surface as SNOW, and an icy road surface as ICE.

The brake controller 10 and the controller 20 are connected via a CAN communication line. The controller 20 receives data such as pulse signals of the vehicle wheel speed sensors SS, the vehicle wheel speed Vw, the vehicle body speed Vx, the longitudinal acceleration rate Gx, the lateral acceleration rate Gy, and the yaw rate Yaw from the brake controller 10. The brake controller 10 receives data such as engine torque information, the shift position, and the driving force distribution condition from the controller 20.

Figure 2:
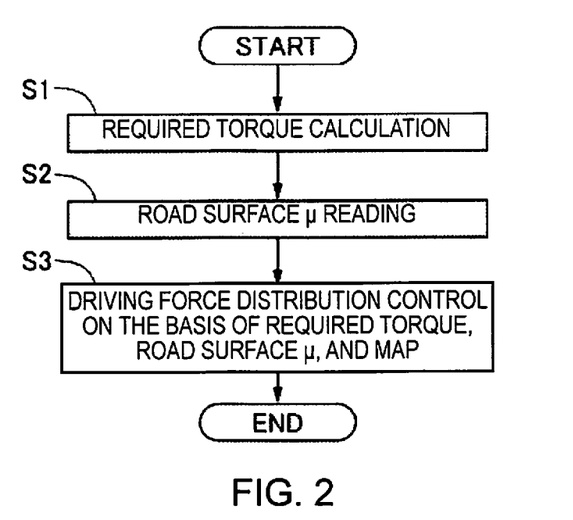
FIG. 2 is a flowchart representing a control flow of driving force distribution control of the vehicle in the first embodiment.

FIG. 2 is a flowchart representing a control flow of driving force distribution control of the vehicle in the first embodiment.

In step S1, required torque requested by a driver is calculated based on the accelerator pedal position. Torque required from these controls is calculated as the required torque when VDC or automatic driving control is being executed.

In step S2, a road surface friction coefficient (written below as road surface μ) is read from a road surface condition determination process. Details of the road surface condition determination process are described hereinafter.

Figure 3:
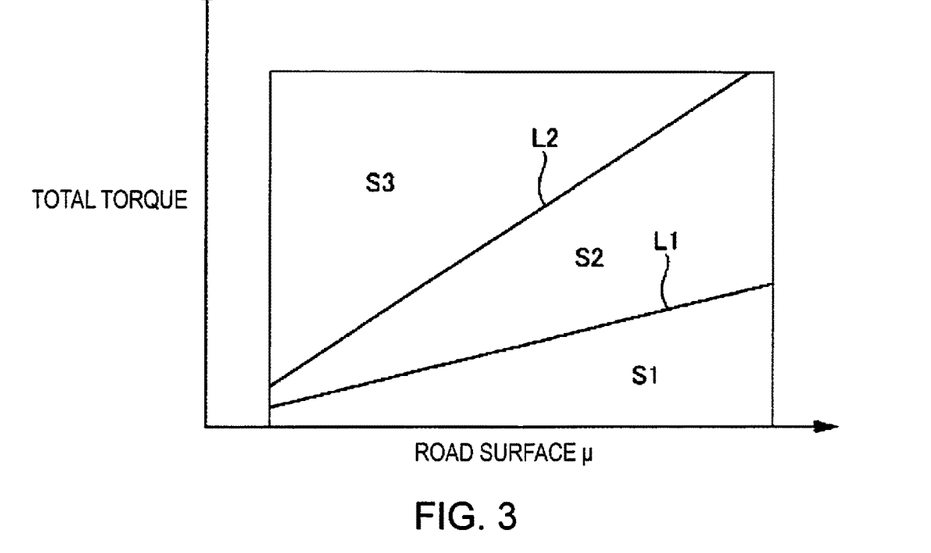
FIG. 3 is a control map of driving force distribution control of the vehicle in the first embodiment.

In step S3, driving force distribution control is executed based on the required torque, the road surface μ, and a control map shown in FIG. 3.

FIG. 3 is a control map of driving force distribution control of the vehicle in the first embodiment. The horizontal axis indicates road surface friction coefficient, and the vertical axis indicates a total torque of the front drive shaft FDS and the rear drive shaft RDS. A threshold value L1 in FIG. 3 represents a maximum value of torque that the rear wheels can transmit to the road surface, and a threshold value L2 represents a maximum value of torque that can be transmitted to the road surface from both the front wheels and the rear wheels. A region S1 below the threshold value L1 in FIG. 3 is a region representing travel in rear-wheel drive. A characteristic of the threshold value L1 is that the value of L1 is small if the road surface μ is low, and the value of L1 is large if the road surface μ is high. A region S2 above the threshold value L1 and below the threshold value L2 in FIG. 3 is a region representing travel in four-wheel drive. Of the torque outputted from the engine 1, the driving force distribution control unit distributes L1 to the rear wheels and the remaining torque to the front wheels.

A region S3 above the threshold value L2 in FIG. 3 is a region where a torque reduction is required of the engine 1 while the vehicle is traveling in four-wheel drive. The region S3 represents excessive torque being outputted from the engine 1 when, of the torque outputted from the engine 1, L1 has been distributed to the rear wheels and the difference between L2 and L1 has been distributed to the front wheels. In this case, driving force distribution control issues a torque reduction request to the engine 1 of a torque amount obtained by subtracting L2 from the engine torque. A stable traveling condition is thereby achieved through an optimal driving force distribution that corresponds to the road surface condition.

Figure 4:
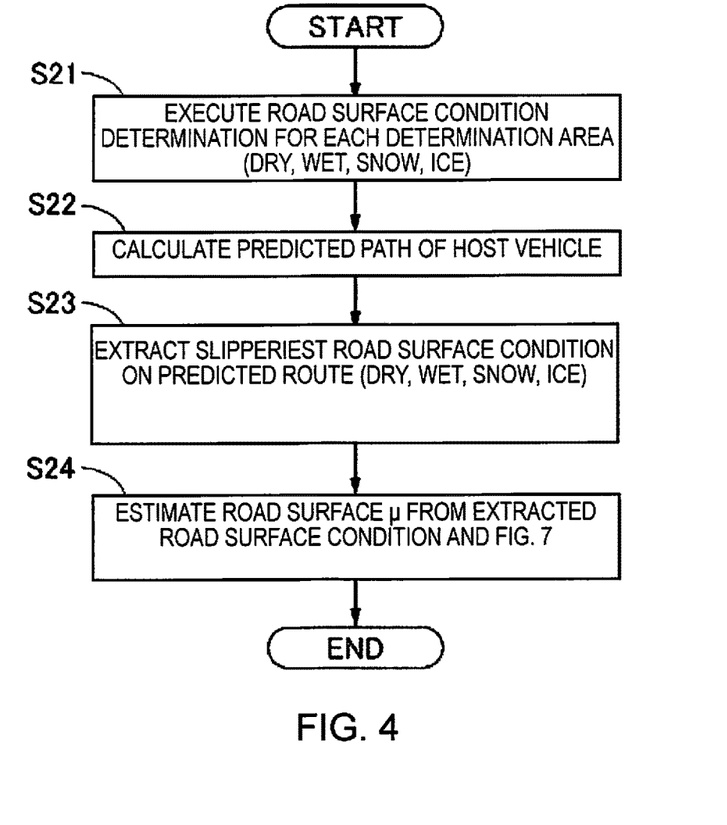
FIG. 4 is a flowchart representing a road surface condition determination process in the first embodiment.

FIG. 4 is a flowchart representing the road surface condition determination process in the first embodiment.

Figure 5:
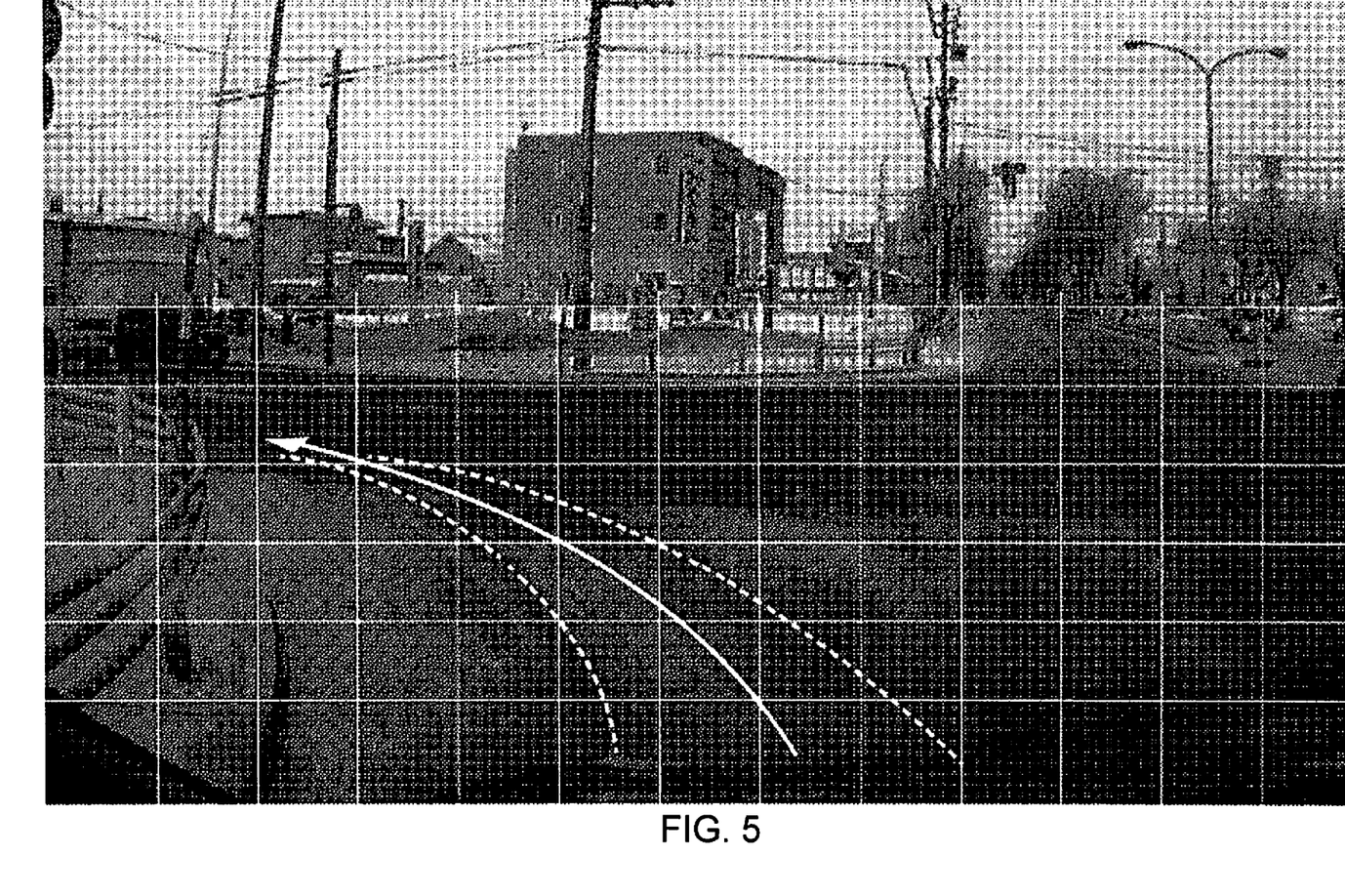
FIG. 5 is a picture representing determination areas in a captured image of a view ahead of the vehicle in the first embodiment.

In step S21, a road surface condition determination of each determination area is executed from an image captured by the camera 5. FIG. 5 is a picture representing determination areas in a captured image of the view ahead of the vehicle in the first embodiment. Determination areas, which are obtained by dividing the ahead-of-vehicle image, are established in the captured image. In the road surface condition determination unit, the road surface condition in each of the determination areas is determined as either DRY, WET, SNOW, or ICE.

Figure 6:
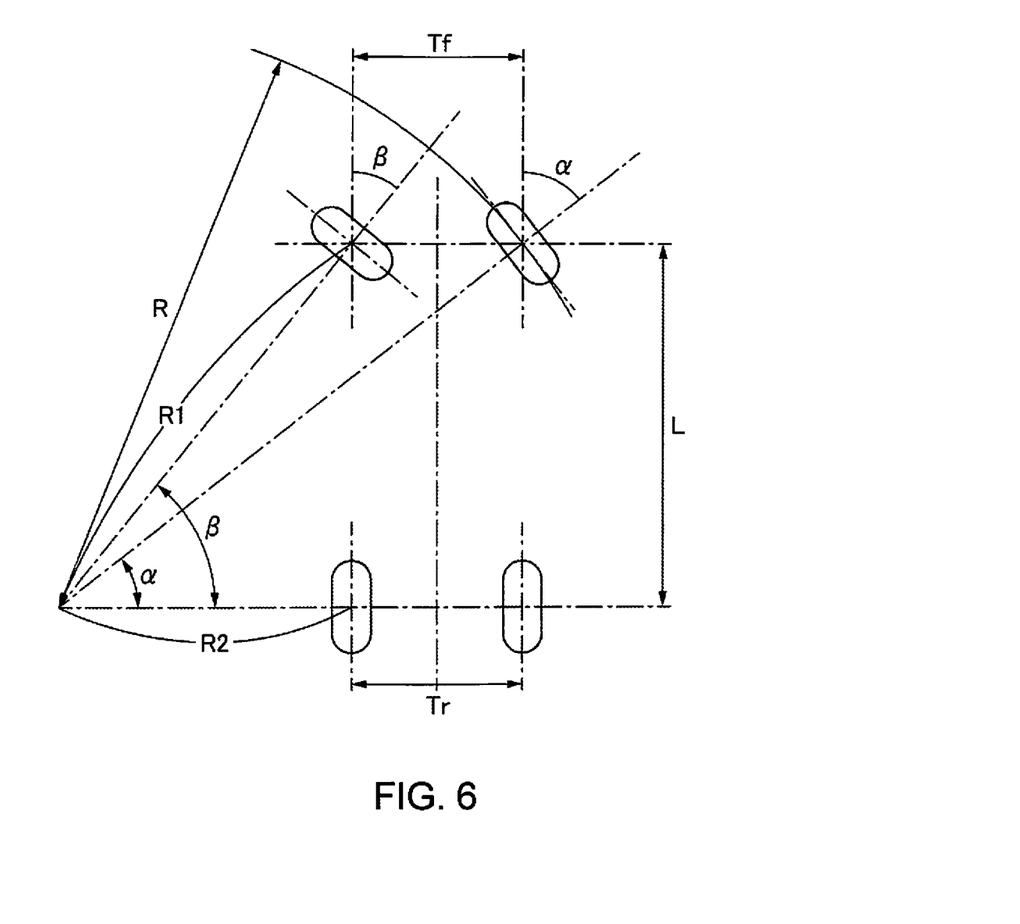
FIG. 6 is a model diagram for calculating a predicted path in the first embodiment.

In step S22, a predicted path for the host vehicle is calculated. FIG. 6 is a model diagram for calculating a predicted path in the first embodiment. When a predicted path is calculated, the path is calculated based on Ackermann theory. When a front-wheel tread is designated as Tf, a rear-wheel tread as Tr, a wheel base as L, a cutting angle of a front inner turning wheel as β, a cutting angle of a front outer turning wheel as α, a radius from a turning center to the front inner turning wheel as R1, a radius from the turning center to the front outer turning wheel as R, and a length from the turning center to a rear inner turning wheel as R2, R representing an inner turning wheel trajectory and R1 representing an outer turning wheel trajectory are represented by the relational expression below. The dotted lines in FIG. 5 represent predicted routes of the front inner and outer turning wheels. The cutting angles α,β can be calculated from a steering angle of a steering wheel and vehicle dimensions.

$$R=\{(L/\sin\alpha)+(L^2+((L/\tan\beta)+Tf)^2)^{1/2}\}/2$$

$$R1=(R2^2+L^2)^{1/2}=((R\cos\alpha-Tr)^2+L^2)^{1/2}$$

In step S23, a slipperiest road surface condition on the predicted route from among road surface conditions (DRY, WET, SNOW, ICE) in a grid is extracted.

Figure 7:
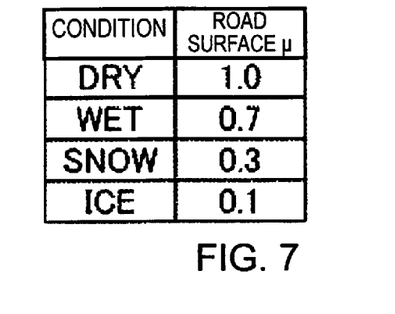
FIG. 7 is a table representing a relationship between a road surface condition and a road surface μ in the first embodiment.

In step S24, the road surface μ is estimated from the extracted road surface condition and a table shown in FIG. 7. FIG. 7 is a table representing a relationship between road surface condition and road surface μ. When the condition is DRY, the road surface μ is set to 1.0; when the condition is WET, the road surface μ is set to 0.7; when the condition is SNOW, the road surface μ is set to 0.3; and when the condition is ICE, the road surface μ is set to 0.1. These values of road surface μ may also be set to other values through experimentation, etc., and are not particularly limited.

The action of the road surface condition determination process shall next be described. When the road surface condition ahead of the vehicle is determined from the image captured by the camera 5, there could be a scenario in which a low μ road and a high μ road are distributed ahead of the vehicle. For example, when traveling on a morning after a snowfall, there would often be scenarios in which snow is melted and μ is high in a central region of a road having a large amount of traffic (written below as a main road), and μ is low in a road intersecting the main road and having a low amount of traffic (written below as a non-main road) because snow remains. Also, should a vehicle make a right or left turn from the main road toward the non-main road, the vehicle would pass through a region outside of the central region of the main road, and this region would have a low μ if snow remains in the region.

In this way, when regions each having a different road surface μ are present ahead of the vehicle, a sufficient driving force is not produced when, from the standpoint of ensuring vehicle safety, control is performed by assessing as a low μ even when the vehicle passes through a central region of a main road having little snow. Also, when the assessment is made using only the road surface μ of the central region of the main road and a large driving force is outputted, it is difficult to ensure vehicle stability due to an excessive driving force when the vehicle turns right or left toward a non-main road and travels in the direction of a low μ. In view of this, in the first embodiment, the route of the host vehicle is predicted and the road surface condition on the predicted route is determined, whereby an appropriate road surface μ and corresponding driving force distribution control are achieved.

The following operational effects are achieved in the first embodiment as is described above.

(1) When determining the road surface condition based on information acquired by the camera 5 installed in the vehicle, the controller 20 predicts the route of the host vehicle (step S22) and determines the road surface condition of the predicted route (step S23).

In other words, the road surface condition determination device includes a step S22 (prediction unit) involving predicting the route of the host vehicle and a step S23 (determination unit) involving determining the road surface condition of the predicted route based on the information acquired by the camera 5 installed in the vehicle.

Therefore, it is possible to determine a road surface condition necessary to the host vehicle.

(2) The controller 20 divides the ahead-of-vehicle image acquired by the camera 5 into determination areas, determines the road surface condition of each determination area (step S21), and determines the road surface condition based on the road surface conditions in the determination areas the predicted route will pass through.

Therefore, at all times, in addition to the road surface condition in the direction in which the vehicle proceeds, road surface conditions in non-proceeding directions can also be ascertained, and even when the route is changed, the post-change road surface condition can be instantly ascertained.

Second Embodiment

The second embodiment shall next be described. Only points of difference shall be described because the basic configuration is the same as that in the first embodiment. In the first embodiment, when a road surface condition is estimated, first, the road surface conditions in the captured image of the view ahead of the vehicle are all determined irrespective of the predicted route, and the road surface condition through which the predicted route of the host vehicle will pass is then extracted. By contrast, in the second embodiment, the predicted route of the host vehicle is calculated and a determination area is decided at a point of intersection between the predicted route of the host vehicle and a road surface condition determination line set ahead of the current host vehicle position by a prescribed distance. The second embodiment differs in that the road surface condition of the determination area containing this intersection point is extracted, and the road surface μ is estimated based on the extracted road surface condition.

Figure 8:
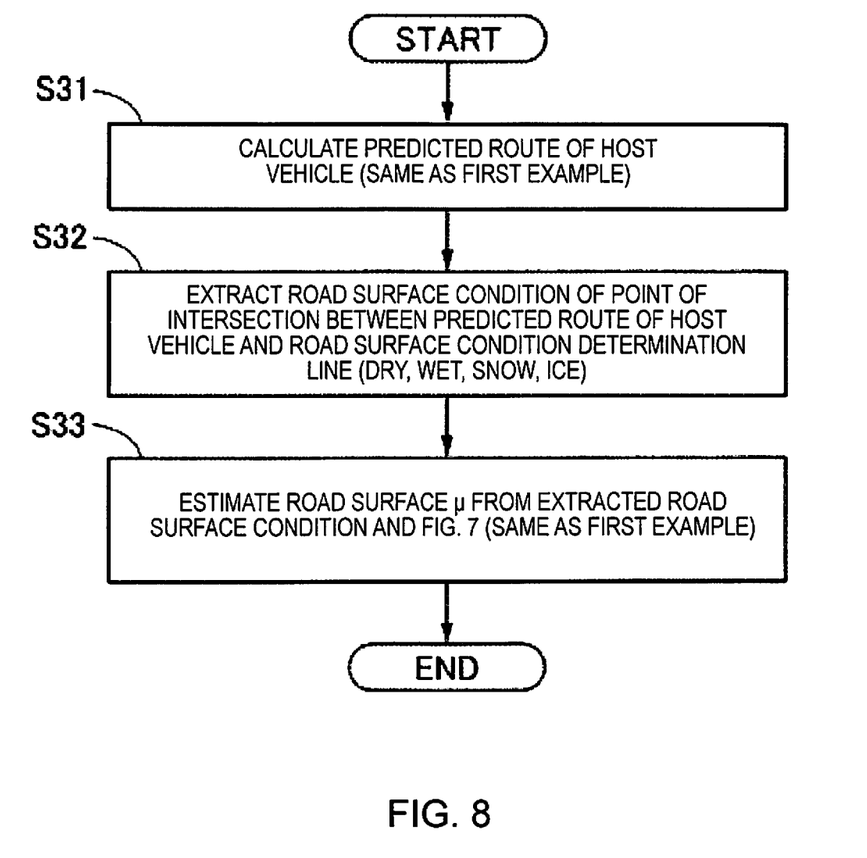
FIG. 8 is a flowchart representing a road surface condition determination process in accordance with a second embodiment.

FIG. 8 is a flowchart representing the road surface condition determination process in the second embodiment.

In step S31, the predicted route of the host vehicle is calculated. This calculation is identical to that in step S22 in the first embodiment, and a description is therefore omitted.

In step S32, the road surface condition of the determination area containing the point of intersection between the predicted route of the host vehicle and the road surface condition determination line is extracted. The road surface condition determination line is set ahead of the current host vehicle position by, for example, 10 m, but is not particularly limited and may be set to another distance if the distance is one to which driving force distribution control can adapt.

Figure 9:
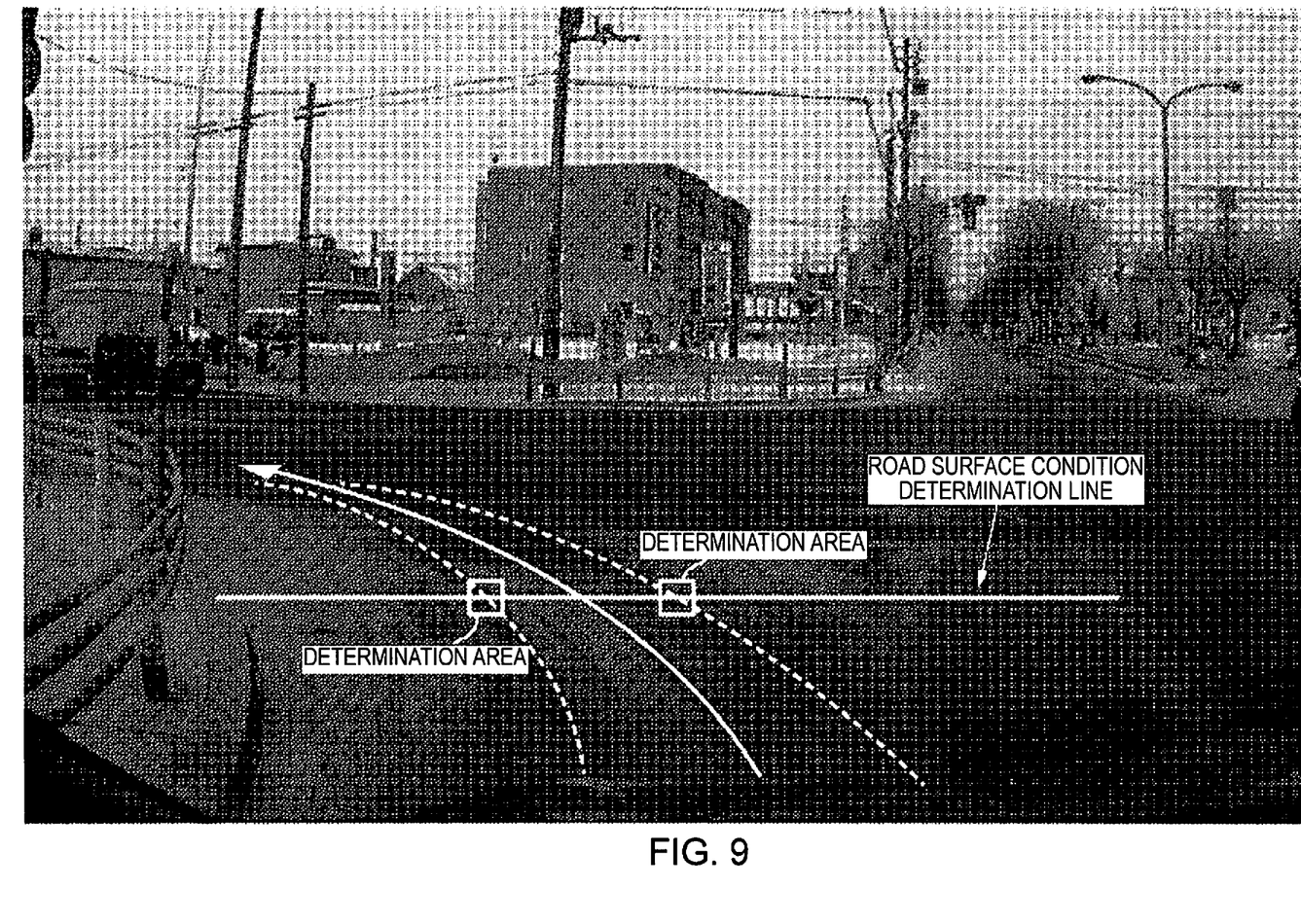
FIG. 9 is a picture representing determination areas containing points where the predicted path of the host vehicle and a road surface condition determination line intersect in a captured image of the view ahead of the vehicle in the second embodiment.

FIG. 9 is a picture representing determination areas containing intersection points between the predicted route of the host vehicle and the road surface condition determination line in a captured image of a view ahead of the vehicle in the second embodiment. The road surface condition in the determination areas the host vehicle will pass through is determined as either DRY, WET, SNOW, or ICE.

In step S33, the road surface μ is estimated from the extracted road surface condition and the table shown in FIG. 7. The estimation specifics are the same as in the first embodiment and are therefore omitted.

Specifically, in the first embodiment, the computation load for the determination is large because all road surface conditions in the captured image of the view ahead of the vehicle are determined. By contrast, in the second embodiment, the computation load can be reduced because only the road surface conditions of determination areas corresponding to the predicted route of the host vehicle are determined and these conditions are used to estimate the road surface μ.

The following operational effects are achieved in the second embodiment as is described above.

(3) The controller 20 extracts determination areas through which the predicted route will pass from the ahead-ofvehicle image acquired by the camera 5 and determines the road surface condition of these determination areas.

Therefore, the computation load when determining road surface conditions can be reduced, and a quick road surface μ estimation can be realized.

Other Embodiments

The present invention was described above based on the examples, but the specific configuration may be other configurations. In the first embodiment, an example is presented in which the invention is applied to a four-wheel-drive vehicle having a rear-wheel-drive base, but the invention may also be applied to a four-wheel-drive vehicle having a front-wheel-drive base.

In the first embodiment, the road surface μ to be used when performing driving force distribution control is estimated, but an estimated road surface μ may be used in automatic driving control or other types of control such as ABS and VDC.

In the examples, the predicted route is calculated based on Ackermann theory, but when a destination is set in a navigation system, predicted route information may be taken from the navigation system.

In the examples, road surface conditions are determined from the image from the camera 5, which is capable of imaging ultraviolet images, infrared images, and temperature distribution images, but this configuration is not provided by way of limitation, and road surface conditions may be determined by a laser, millimeter waves, or other various types of radar.

In the second embodiment, road surface conditions of determination areas at intersection points between the predicted route of each wheel and the road surface condition determination line are determined, but determination areas including intersection points are not provided by way of limitation; road surface conditions of determination areas including intersection points between center points of the left and right front wheels and the road surface condition determination line may also be determined, and the lowest road surface μ of these may be employed.

The invention claimed is:

1. A road surface condition determination method comprising:
   calculating a predicted route of a host vehicle; and
   determining a road surface friction coefficient of the predicted route based on information acquired by a camera installed in the host vehicle by:
     dividing an ahead-of-vehicle image acquired by the camera in a left-right direction to obtain a plurality of determination areas and determining a road surface condition for each of the plurality of determination areas,
     setting a road surface condition determination line ahead of the host vehicle position by a predetermined distance, and
     extracting, from among the plurality of determination areas, determination areas containing points of intersection between the predicted route and the road surface condition determination line from the ahead-of-vehicle image
     determining the road surface friction coefficient in the determination areas containing the points of intersection.

2. The road surface condition determination method according to claim 1, wherein
   the predicted route of the host vehicle includes a predicted path of a left front wheel of the host vehicle and a predicted path of a right front wheel of the host vehicle, and
   the points of intersection are points of intersection between the predicted paths and the road surface condition determination line from the ahead-of-vehicle image.

3. A road surface condition determination device comprising:
   a prediction unit that calculates a predicted route of a host vehicle; and
   a determination unit that determines a road surface friction coefficient of the predicted route based on information acquired by a camera installed in the host vehicle by:
     dividing an ahead-of-vehicle image acquired by the camera in a left-right direction to obtain a plurality of determination areas and determining a road surface condition for each of the plurality of determination areas,
     setting a road surface condition determination line ahead of the host vehicle position by a predetermined distance, and
     extracting, from among the plurality of determination areas, determination areas containing points of intersection between the predicted route and the road surface condition determination line from the ahead-of-vehicle image, and
     determining the road surface friction coefficient in the determination areas containing the points of intersection.

* * * * *